United States Patent [19]
Terasawa et al.

[11] Patent Number: 4,785,314
[45] Date of Patent: Nov. 15, 1988

[54] INTERNALLY PRESSURE-REGULATED INK SUPPLY

[75] Inventors: Koji Terasawa, Mitaka; Akira Miyakawa, Tanashi; Takehiko Kiyohara, Zama, all of Japan

[73] Assignee: Canon Kabushiki Kaisha, Tokyo, Japan

[21] Appl. No.: 56,347

[22] Filed: May 27, 1987

Related U.S. Application Data

[63] Continuation of Ser. No. 709,298, Mar. 7, 1985, abandoned.

[30] Foreign Application Priority Data

Mar. 14, 1984 [JP] Japan ................................... 59-48683
Mar. 14, 1984 [JP] Japan ................................... 59-48685
Mar. 14, 1984 [JP] Japan ................................... 59-48686

[51] Int. Cl.$^4$ ............................................ G01D 15/18
[52] U.S. Cl. .................................. 346/140 R; 346/75; 346/140 A
[58] Field of Search ................... 346/140 R, 75, 140 A

[56] References Cited

U.S. PATENT DOCUMENTS

| | | | |
|---|---|---|---|
| 4,419,678 | 12/1983 | Kasugayama et al. | 346/140 R |
| 4,503,442 | 3/1985 | Barbero et al. | 346/140 R |
| 4,503,443 | 3/1985 | Dagna et al. | 346/140 R |
| 4,599,625 | 7/1986 | Terasawa et al. | 346/140 R |

Primary Examiner—E. A. Goldberg
Assistant Examiner—Gerald E. Preston
Attorney, Agent, or Firm—Fitzpatrick, Cella, Harper & Scinto

[57] ABSTRACT

A liquid ejection recording apparatus has a carriage, a liquid ejection recording unit, a lever biased by a spring for mounting the unit on the carriage, and a communication hole portion formed in an ink tank in the unit. When the unit is fixed on the carriage for printing, a projection presses the communication hole portion to provide a communication hole for communicating the interior of the ink tank with the outer atmosphere. Stable ink ejection is guaranteed without clogging of a nozzle or the like and regardless of the amount of ink remaining in the ink tank.

19 Claims, 6 Drawing Sheets

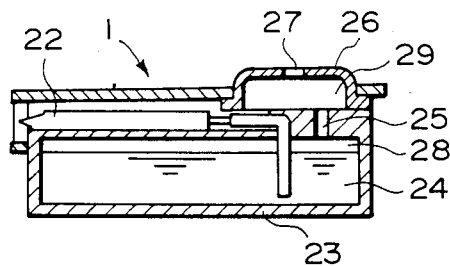
F I G. 2
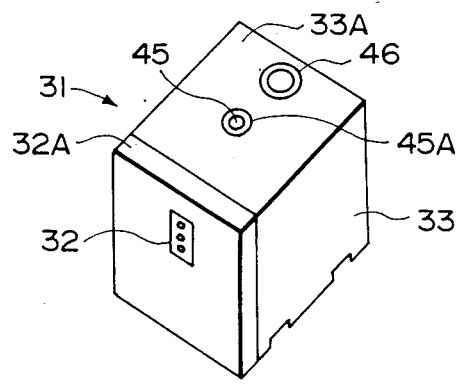
F I G. 3
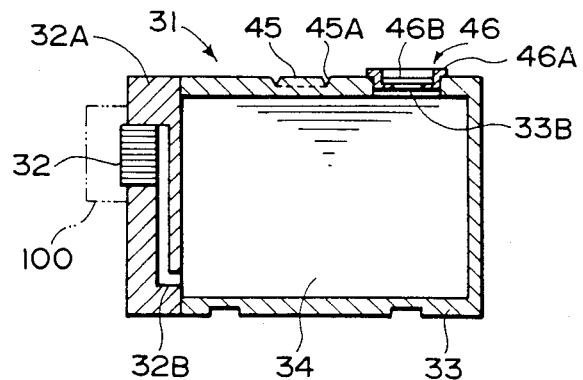
F I G. 4

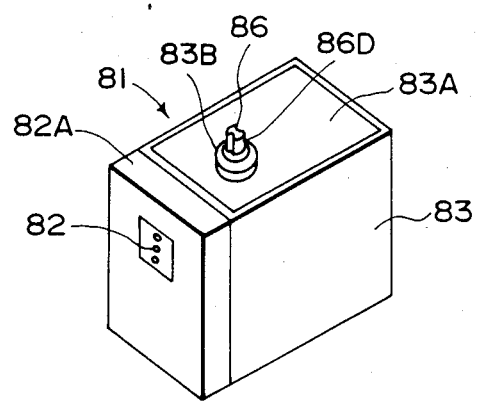
F I G. 8
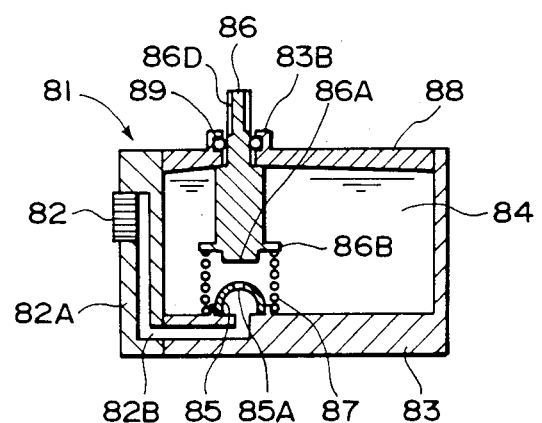
F I G. 9

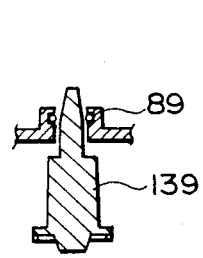
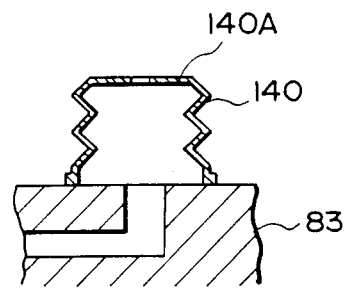
F I G. 12    F I G. 13
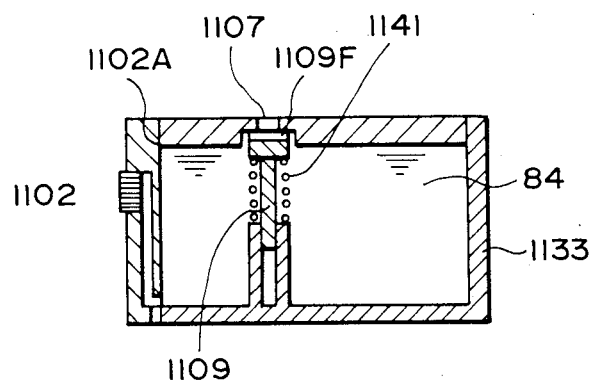
F I G. 14

INTERNALLY PRESSURE-REGULATED INK SUPPLY

This application is a continuation of application Ser. No. 709,298, filed Mar. 7, 1985, now abandoned.

BACKGROUND OF THE INVENTION

1. Field of the Invention

The present invention relates to a liquid ejection recording unit and a liquid ejection recording apparatus.

2. Description of the Prior Art

FIG. 1 shows an example of the configuration of a liquid ejection apparatus.

Referring to FIG. 1, a liquid ejection recording unit 1 is mounted on a carriage 2 and has a container for containing ink therein and a recording head having a nozzle section for ejecting the ink. The units are arranged in a number corresponding to the number of inks of different colors to be used for recording or printing.

A flexible cable 6 connects between a control section (not shown) for controlling ink ejection and the liquid ejection recording unit 1.

A paper feeding motor 8 drives rollers 10 to convey a recording sheet P in a direction indicated by arrow f. Rollers 12 together with the rollers 10 keep the recording sheet P flat and thus define a recording surface with respect to the unit 1.

A belt 14 has the carriage 2 fixed thereon for driving it. A motor 16 drives the belt 14 in directions indicated by arrow S. When the carriage is driven by the motor 16, it is moved along guide rails 18 in the directions of the arrow S so as to record on the recording surface.

In the liquid ejection recording unit mounted on the carriage of such a liquid ejection recording apparatus, when the unit is mounted on the carriage, the interior of the ink container communicates with the atmosphere so as to allow ink ejection from the nozzle section.

In a conventional liquid ejection recording unit, when the unit must be stored for a long period of time or transferred from one location to another, an opening for replenishing the container with ink is closed with a closing member. When the unit is mounted on the carriage, the closing member is removed to allow communication of the opening with the outer atmosphere and to allow ink ejection from the nozzle section.

The closing member conventionally comprises, for example, a rubber stopper or a water-repellent filter. However, when a rubber stopper is used as the closing member, the operator must remove it by hand. However, since a liquid ejection recording unit is generally small in size, removal of the stopper is not easy and the portion surrounding the opening may be contaminated with ink. Conversely, even if a water-repellent filter is used as the closing member, the filter tends to clog when the carriage is being driven. This results in insufficient supply of air to the ink container.

FIG. 2 shows another example of the configuration of a conventional liquid ejection recording unit 1 different from the above-mentioned unit which is normally communicated with outer atmosphere. An ink container 23 contains ink 24 and supplies it to a nozzle section 22. An air layer 28 is formed at the upper surface portion of the ink 24 in the container 23. A diaphragm 26 is a pressurizing means for the ink container 23 so as to prevent clogging of the nozzle section and to prevent introduction of air bubbles. A communication hole 25 communicates between the ink container 23 and an air chamber 29 defined by the diaphragm 26. A communication hole 27 is formed in the diaphragm 26 so as to communicate the air chamber 29 with the outer atmosphere.

The conventional liquid ejection unit 1 shown in FIG. 2 has a pressurizing mechanism so as to recover the ejection capacity of the nozzle section when the nozzle section clogs or air bubbles are introduced. As such a pressurizing mechanism, a diaphragm is arranged outside the ink container. When the diaphragm is depressed, ink contained in the ink container is pressurized and the ejection capacity of the nozzle section is recovered.

In the conventional pressurizing mechanism as described above, he operator closes the communication hole 27 while the depresses the diaphragm 26. Then, the air layer 28 is compressed through the communication hole 25, and the ink 24 is pressurized so as to recover the ejection capacity of the nozzle section 22.

However, in the conventional liquid ejection recording apparatus having such a pressurizing mechanism, as the ink 24 inside the container is depleted, the pressurizing capacity obtained with the diaphragm 26 is unavoidably changed. More specifically, in the conventional liquid ejection recording unit, the pressurizing pressure fluctuates widely in accordance with a change in the volume of the air layer 28 and the ejection capacity is thus rendered unstable (first problem).

In order to maintain a sufficient pressurizing capacity when the ink 24 is depleted and the volume of the air layer 28 is increased, the pressurizing efficiency of the diaphragm 26 must be increased. Therefore, a second problem arises in that the liquid ejection recording unit is rendered bulky, while the first problem of unstable ejection capacity remains.

When a detachable liquid ejection recording unit of a conventional liquid ejection recording apparatus is stored during a non-usage period, for example, when the unit is replaced with another unit for printing in a different color ink or when the unit must be transferred from one location to another, the opening of the nozzle section and the communication hole must be closed to prevent leakage of ink therefrom. In the nozzle section, the orifice opening generally has a diameter of 100 μm or less so that leakage can be prevented by the surface tension of the ink. However, compared with the nozzle section, the air communication hole has a large sectional area. When the unit is tipped over during storage or the like, ink leakage occurs and the storage location is contaminated. The air communication hole can be closed with a rubber stopper but this entails an extra step on the part of the operator.

SUMMARY OF THE INVENTION

The present invention has been made in consideration of this and has as its object to provide a liquid ejection recording unit and a liquid ejection recording apparatus wherein, when the unit is mounted on a carriage, the ink container easily communicates with the outer atmosphere.

It is another object of the present invention to provide a liquid ejection recording apparatus in which a hole communicating with the outer atmosphere can be freely opened or closed when a liquid ejection recording unit is mounted on or demounted from a carriage.

It is still another object of the present invention to provide a liquid ejection recording unit which is free from the problems of conventional units of the same type, and which has a pressurizing mechanism capable of producing a constant pressure regardless of the level of ink remaining in an ink container, so that stable ejection can be guaranteed.

It is still another object of the present invention to provide a liquid ejection recording unit having an ink discharge means for discharging ink droplets from an orifice and an ink containing means for containing ink to be supplied to the ink discharge means, wherein a predetermined portion of the ink container has less strength than the remaining portions thereof so that the predetermined portion can be opened in accordance with an external force acting thereon to allow communication of the container with the outer atmosphere.

It is still another object of the present invention to provide a liquid ejection recording unit having an ink discharge means for discharging ink droplets from an orifice and an ink containing means for containing ink to be supplied to the ink discharge means, wherein the ink containing means has a pressurizing means for supplying a pressurized liquid to the ink injecting means.

It is still another object of the present invention to provide a liquid ejection recording apparatus comprising: a carriage movable along a predetermined direction of a recording surface of a recording medium; a liquid ejection recording unit having ink discharge means for discharging ink droplets from an orifice, and ink containing means for containing ink to be supplied to said ink discharge means, said liquid ejection recording unit having a portion in said ink containing means of less strangth than remaining portions thereof so that the portion can be opened and communicate with the outer atmosphere upon application of an external force; and fixing means for fixing said liquid ejection recording unit on said carriage.

It is still another object of the present invention to provide a liquid ejection recording apparatus comprising: a carriage movable along a predetermined direction of a recording surface of a recording medium; a liquid ejection recording unit having ink discharge means for discharging ink droplets from an orifice, and ink containing means for containing ink to be supplied to said ink discharge means, said liquid ejection recording unit recording on the recording surface upon movement of said carriage; fixing means for fixing said liquid ejection recording unit on said carriage; and open/close means, arranged at said ink containing means, for communicating the interior of said ink containing means with the outer atmosphere when said fixing means fixes said liquid ejection recording unit, and for shielding the interior of said ink containing means from the outer atmosphere when said fixing means releases said liquid ejection recording unit from said carriage.

BRIEF DESCRIPTION OF THE DRAWINGS

FIG. 2 is a sectional view showing the structure of a liquid ejection recording unit in the apparatus shown in FIG. 1;

FIGS. 3 and 4 are respectively a perspective view and a sectional view showing the construction of a liquid ejection recording unit according to an embodiment of the present invention;

FIGS. 8 and 9 are respectively a perspective view and a sectional view showing the construction of a liquid ejection recording unit in a liquid ejection recording apparatus according to another embodiment of the present invention;

FIG. 12 is a sectional view showing another construction of a press member in the recording unit shown in FIGS. 10 and 11;

FIG. 13 is a sectional view showing another construction of a pressurizing means; and FIG. 14 is a sectional view showing an example of the construction of a liquid ejection recording means which does not have a pressurizing means.

DETAILED DESCRIPTION OF THE PREFERRED EMBODIMENTS

Figure 1:
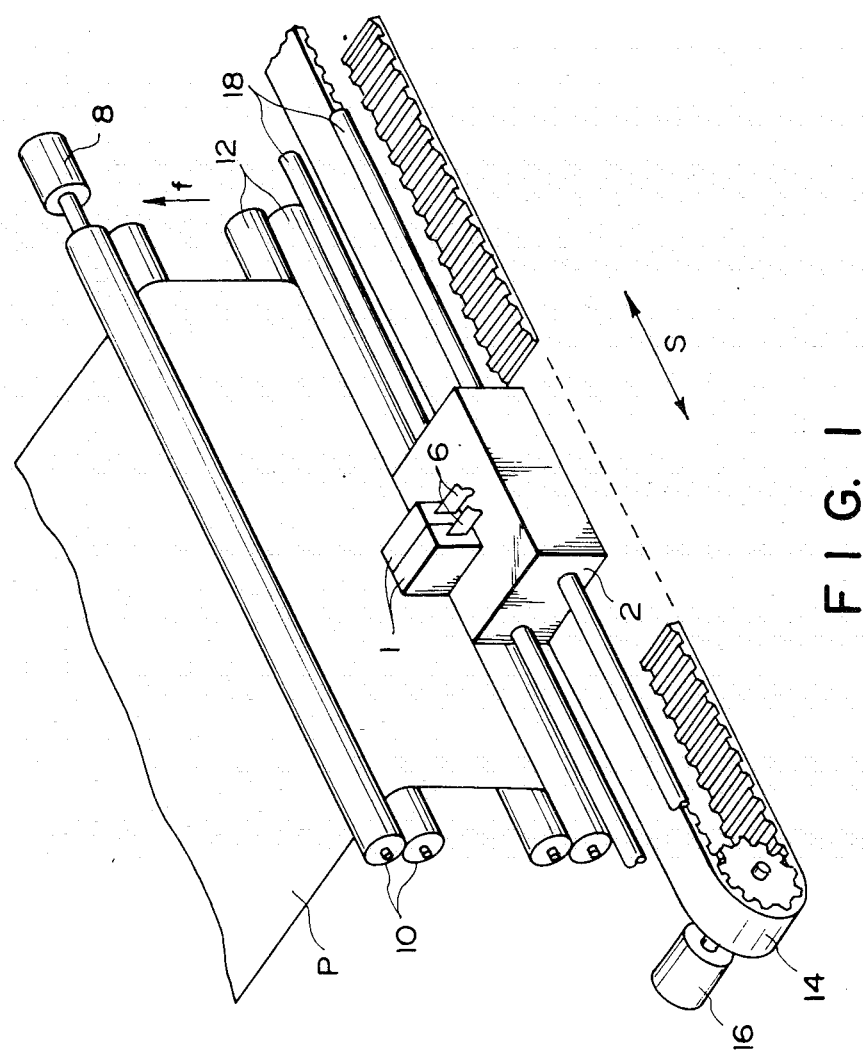
FIG. 1 is a perspective view showing an example of the general construction of a liquid ejection recording apparatus.

The preferred embodiment of the present invention will be described in detail below.

FIGS. 3 and 4 are respectively a perspective view and a sectional view showing the construction of a liquid ejection recording unit (to be referred to as a recording unit for brevity hereinafter) 31 according to an embodiment of the present invention. Referring to FIGS. 3 and 4, a nozzle plate 32A holds a nozzle section 32. An ink communication path 32B connects the nozzle section 32 with an ink container 33 so as to supply ink 34 in the container to the nozzle section 32. A communication hole portion 45 is formed by a perforation 45A in a part of an upper plate 33A of the container. When an external force acts on the communication hole portion 45, it is separated from the perforation 45A to provide a communication hole with the outer atmosphere.

The communication hole portion 45 preferably has a size such that when a carriage 2 is moved, the opening formed upon formation of the communication hole will not permit leakage of ink. A stopper 46 covers an opening 33B for allowing the container 33 to be filled with ink. After the container 33 is filled with ink, the opening 33B is sealed by pressing the stopper 46 into position or by heat melting the stopper 46. The stopper 46 has, for example, an elastic member 46A which is fitted in the opening 33B and has an opening, and a lid member 46B which is adhered or welded to the elastic member 46A to close its opening. The member 46B is made of a laminate material such as an aluminum laminate having a low gas permeability so as to prevent evaporation of the ink.

In addition to the above means, a lid 100 is provided to cover the nozzle section 32 when the recording unit 31 is stored or transferred. Then, the ink 34 can be sealed inside the recording unit 31.

Figure 5:
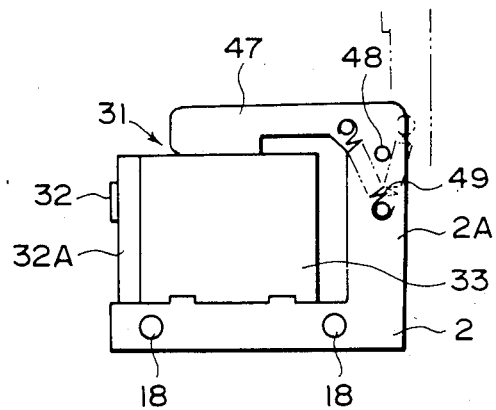
FIGS. 5 and 6 are respectively a side view and a sectional view showing the state wherein the unit shown in FIGS. 3 and 4 is mounted on a carriage of the apparatus shown in FIG. 1.
Figure 6:
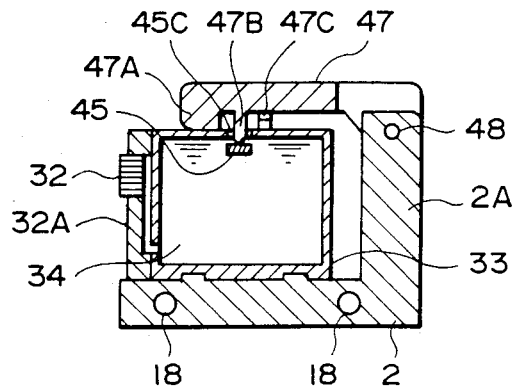

FIGS. 5 and 6 are respectively a side view and a sectional view showing the state wherein the recording unit is mounted on the carriage. As shown in FIGS. 5 and 6, the carriage 2 has an upright portion 2A. A lever 47 is pivotally supported on the upright portion 2A through a shaft 48. A spring 49 is hooked between the upright portion 2A and the lever 47. The lever 47 is pivotal between a position at which the recording unit 31 is fixed in position as indicated by the dotted line and a position at which the recording unit 31 is replaced with another unit as indicated by the alternate long and two short dashed line.

The lever 47 has a portion 47A which abuts against the recording unit 31 so as to attach it, and a projection 47B arranged to oppose the communication hole portion 45 so as to press the communication hole portion 45. A communication hole 47C is formed in the side wall of the portion 47A.

As shown in FIG. 6, when the recording unit 31 is fixed on the carriage 2 by the lever 47, the projection 47B opens the communication hole portion 45 to the container 33 due to the biasing force of the spring 49 or the like. The interior of the container then communicates with the outer atmosphere through the gap between the projection 47B and the opening 45C formed upon removal of the communication hole portion 45.

Figure 7:
FIG. 7 is a cross-sectional view showing an example of a projection which can be used in a stopper section in the unit according to the present invention.

Another projection can also be formed at a position on the lever 47 so as to oppose the stopper 46 and allow communication with the outer atmosphere through the stopper 46. For this purpose, a projection 147B having a cross-sectional shape as shown in FIG. 7, i.e., a projection 147B with communication grooves 147C is formed. When the recording unit 31 is fixed to the carriage, the projection 147B extends through a lid member so that the interior of the container communicates with the outer atmosphere through the communication grooves 147C. Although not shown in the figure, the projection can be tapered thinner toward its distal end or the sectional area of the projection can be stepped at that portion to provide a similar effect.

Furthermore, instead of removing the communication hole portion 45, it can be partially opened by pressing with the projection 47A. When the projection 47A is not arranged, a rod or the like can be used to remove or partially open the communication hole portion 45 in a similar manner.

The communication hole portion 45 and the stopper 46 can comprise a metal, a resin, rubber of thin films thereof. In this case, when the recording unit 31 is fixed to the carriage, the portion 45 and the stopper 46 can be removed or partially replaced to allow communication of the interior of the container with the outer atmosphere.

In the above embodiment, the communication hole portion 45 and the stopper 46 are arranged on the upper surface of the container. However, they need only be formed above the level of the ink 34 inside the container and can therefore be formed on side surfaces of the container.

In the above embodiment, the communication hole portion 45 and the stopper 46 are arranged in the recording unit 31. However, the stopper 46 can be arranged independently, and a projection as shown in FIG. 7 can be formed on the lever in correspondence with the stopper 46.

The opening formed in the recording unit 20 preferably has a size which does not allow easy leakage of ink when vibration or the like occurs. For example, the opening of the recording unit is formed to have a size preventing ink leakage by meniscus phenomenon due to surface tension of the ink. More specifically, although it depends upon the surface tension of the ink contained, the inner diameter of the opening of the recording unit is preferably 5 mm or less, more preferably 0.1 to 4 mm, and optimally 0.3 to 2.5 mm. When the inner diameter of the opening is set to fall within this range, even if a liquid having a viscosity of 5.5 c.p. and a surface tension of 50 dyne/cm is contained, ink leakage does not occur under normal use conditions.

When the projection is inserted, the gap between the projection and the opening falls within the above range. That is, when the recording head is mounted and is not removed thereafter, the inner diameter of the opening can be larger than the above range.

When the inner surface of the opening and the projection is coated with a water-repellent agent such as ethylene tetrafluoride, ink leakage can be prevented with a higher reliability.

When the apparatus does not have a projection, a portion having less strength than the remaining portions can be removed with a pin or tip of a ball point pen inserted into the opening of the apparatus.

FIGS. 8 and 9 are respectively a perspective view and a sectional view showing the construction of a liquid ejection recording unit (to be referred to as a recording unit for brevity hereinafter) 81 of a liquid ejection recording apparatus (ink-jet printer) according to another embodiment of the present invention. A nozzle plate 82A holds a nozzle section 82. A communication path 82B connects the nozzle section and an ink container 83 so as to feed ink 84 therein to the nozzle section 82.

A diaphragm 85 is arranged to cover the opening of the communication path 82B which is at the side of the ink container 83. The diaphragm 85 has an opening 85A for feeding the ink to the communication path 82B. The diaphragm 85 can consist of a flexible material such as rubber or a plastic material.

A press member 86 can vertically move and has an end portion 86A. The end portion 86A is used to close the opening 85A while the diaphragm 85 is depressed downward. The press member 86 has a flange portion 86B. The flange portion 86B is supported by a spring 86 which biases the end portion 86A in a direction to separate the end portion 86A from the diaphragm 85. In this embodiment, the other end portion 86C of the press member 86 which is opposite to the end portion 86A projects outward from a sealing portion 83B arranged in a lid 83A. When the projection 86C is depressed downward, the end portion 86A presses the diaphragm 85. An O-ring 89 is disposed at the sealing portion 83B to provide a liquid seal. In the illustrated state wherein the press member 86 is not depressed, the O-ring 89 contacts the side surface of the press member 86 so as to seal the ink. Communication grooves 86D are formed in the projecting end portion 86C. When the press member 86 is depressed beyond a predetermined position, engagement between the O-ring 89 and the press member 86 is released and an air layer 88 communicates with the outer atmosphere.

In the recording unit of this embodiment, when the ink-jet printer is in operation, the air layer 88 is opened to the outer atmosphere, the press member 86 is depressed to the predetermined position to allow ink ejection through the nozzle section 82, and a locking means for locking the press member 86 at the predetermined position is preferably incorporated.

Figure 10:
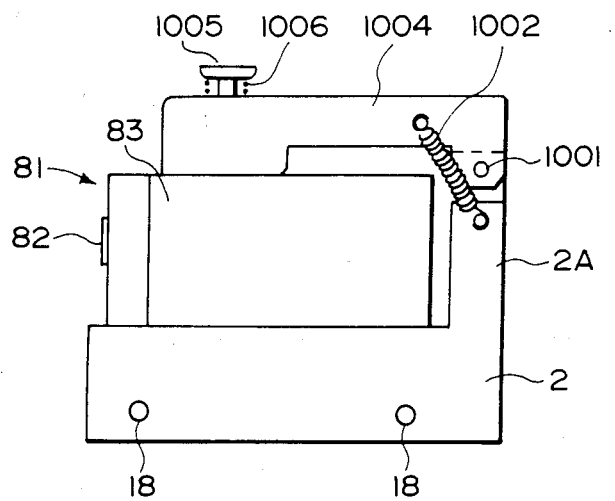
FIGS. 10 and 11 are respectively a side view and a sectional view showing the state wherein the unit is mounted on the apparatus.
Figure 11:
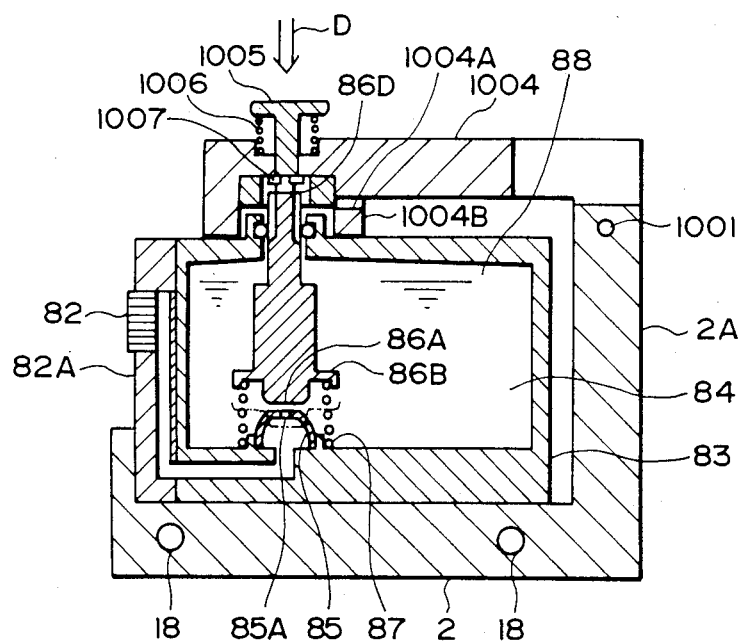

FIGS. 10 and 11 are respectively a side view and a sectional view showing an example of the construction of the locking means. As shown in FIGS. 10 and 11, in this embodiment, a carriage 2 has an upright portion 2A. A lever 1004 is pivotally supported on the upright portion 2A through a shaft 1001. A spring 1002 is hooked between the upright portion 2A and the lever 1004. The lever 1004 abuts against the container 83 to fix the recording unit in position, so that the recording unit is stably held during operation of the ink-jet printer.

A button 1005 is arranged at a position of the lever 1004 which corresponds to the projecting end portion 86C and is supported by the lever 1004 through a button return spring 1006. The spring 1006 preferably has a larger spring constant than that of the spring 87. A locking portion 1007 is arranged at the distal end of the button for depressing the press member 86. When the lever 1004 is fixed at the illustrated position and the button 1005 is not depressed, the locking portion 1007 depresses the press member 86 against the biasing force of the spring 87 to the predetermined position at which the interior of the container 83 communicates with the outer atmosphere.

In this state, since the communication grooves 86D of the press member 86 reach the position of the O-ring 89, the interior of the container communicates with the outer atmosphere through the communication grooves 86D, a recess 1004B formed in the lever 1004 for receiving the projecting end portion 86C, and the communication hole 1004A formed in the lever 1004. Thus, recording by ink ejection through the nozzle section 82 can be performed. The size of the grooves 86D is set appropriately so that ink will not leak from the groove 86D when the carriage 2 is driven during printing. As shown in FIG. 11, an ink absorber can be incorporated at the recess 1004B. In a recording unit detachable from the carriage, ink which has leaked from a portion of the O-ring 89 or the like upon attaching/detaching of the unit can then be reliably collected.

In the recording unit 81 of the construction described above, when the nozzle section 82 clogs or when air bubbles are introduced into the nozzle section 82, i.e., when abnormal ejection occurs, the button 1005 is depressed in the direction indicated by arrow D by hand or other appropriate means. When the button 1005 is depressed, the press member 86 is moved along the direction indicated by arrow D to press the spring 87 and the end portion 86A abuts against the diaphragm 85 closing the opening 85A and reaching the position indicated by the broken line. Thus, the ink can be pressurized regardless of the amount remaining.

When the force acting on the button 1005 is removed after the ink is pressurized, the button 1005 and the press member 86 are returned to the original positions by the springs 1006 and 87. As described above, if the diaphragm 85 comprises a member of rubber or a plastic material, the diaphragm 85 assumes its original shape before the press member 86 is returned by the spring 87. Therefore, the opening 85A immediately communicates with the ink 84 and a negative pressure which acts adversely on the nozzle section 82 is not produced.

When the lever 1004 is removed from the recording unit 81 so as to release engagement between the locking portion and the press member 86, the press member 86 is moved upward by the spring 87, communication between the interior of the container and the outer atmosphere is stopped, and the interior of the container 83 is sealed.

In this embodiment, the press member with the communication grooves is used as shown in FIGS. 9 and 11. However, the shape of the press member is not limited to that of this embodiment. For example, as shown in FIG. 12, a press member 139 can be tapered to have a sectional area decreasing toward the projecting/distal end (outer atmosphere side). As the locking member is moved downward, the engagement between the press member 139 and the O-ring 89 is released and the interior of the container communicates with the outer atmosphere. According to this construction, after pressurizing and release of the locking state by the locking member, the press member 139 can be returned to the original position with substantially no load. Although not shown in the drawing, the press member can be rendered partially thin to provide a portion with a decreased sectional area so as to allow communication with the outer atmosphere by means of this portion.

In the above embodiment, the pressurizing means is a diaphragm. However, as shown in FIG. 13, the pressurizing means can be a bellows 140 having an opening 140A.

In the above embodiment, the nozzle section and the container are formed integrally and are thus mounted on or demounted from the carriage. However, the nozzle section and the container can be separate members and can be coupled on the carriage. The present invention is applicable to a recording unit which is mounted on the carriage. In this case, a communication hole to the outer atmosphere can be provided separately from the press means.

The above embodiment is described with reference to an ink-jet printer having a recording unit with a pressurizing means. However, the present invention is similarly applicable to a recording unit without a pressurizing means. For example, in the construction shown in FIG. 14, a press member 1109 is fitted in a communication hole 1107. The press member 1109 has a sealing member 1109F for closing the communication hole 1107. When the recording unit is not in operation, the press member 1109 is biased upward by a spring 1141 so that the sealing member 1109F closes the communication hole 1107. When the recording unit is mounted, the press member is moved downward by a button fixed on a lever 1005 so as to allow the interior of a container 1133 to communicate with the outer atmosphere.

The size of the gap between the press member and the communication hole is preferably set so that ink will not leak through the gap. More specifically, although the size of the gap will vary in accordance with the properties of ink used, if assumed to be circular in section, it preferably has a size of 5 mm or less, more preferably a size of 0.1 mm to 4 mm, and optimally a size of 0.3 to 2.5 mm. If the size of the gap is 4 mm, when ink having a viscosity of 5.5 c.p. and a surface tension of 50 dyne/cm is contained, ink leakage is not observed.

The inner surface of the communication hole and the corresponding portion of the press member are preferably coated with a water-repellent agent such as an ethylene tetrafluoride resin.

As described above, according to the present invention, when the liquid ejection recording unit is mounted on the carriage, a simple external force acts to allow the interior of the ink container to communicate with the outer atmosphere. Therefore, a liquid ejection recording unit which is easy to mount and safe against ink leakage is realized.

In addition, according to the present invention, a pressurizing mechanism for generating a constant pressure regardless of the amount of ink remaining in the ink container is provided without rendering the apparatus bulky. Therefore, a liquid ejection recording unit capable of stable ink ejection is realized, and reliability of an ink-jet printer can be improved.

Finally, according to the present invention, opening and closing of the interior of the ink container is performed automatically in accordance with the mounting-/demounting of the liquid ejection recording unit. Therefore, an ink-jet printer of safe and excellent operability is realized.

What we claim is:

1. A liquid ejection recording unit comprising:
   ink discharge means including means defining an orifice and means for discharging ink droplets from said orifice;
   ink containing means for containing ink to be supplied to said ink discharge means;
   an ink supply path having an end opening into said ink containing means for supplying ink from said ink containing means to said orifice; and
   pressurizing means provided on the inside of said ink containing means, at said end of said ink supply path opening into said ink containing means, for supplying pressurized ink to said ink discharge means in response to an external force acting on said pressurizing means.

2. A unit according to claim 1, wherein said pressurizing means is located on the lower portion of the inside of said ink containing means.

3. A unit according to claim 1, wherein said pressurizing means has a diaphragm and a press member for pressing said diaphragm.

4. A unit according to claim 1, wherein said pressurizing means has a bellows and a press member for pressing said bellows.

5. A unit according to claim 3, wherein an opening is formed in a portion of said diaphragm which contacts an end of said press member.

6. A unit according to claim 4, wherein an opening is formed in a portion of said bellows which contacts an end of said press member.

7. A unit according to claim 3, wherein said press member has a groove for communicating said ink containing means with the outer atmosphere.

8. A unit according to claim 4, wherein said press member has a groove for communicating said ink containing means with the outer atmosphere.

9. A unit according to claim 3, further comprising locking means for locking said press member at a predetermined position.

10. A unit according to claim 4, further comprising locking means for locking said press member at a predetermined position.

11. A unit according to claim 3, wherein said press member is tapered.

12. A unit according to claim 4, wherein said press member is tapered.

13. A unit according to claim 3, wherein said press member is stepped.

14. A unit according to claim 4, wherein said press member is stepped.

15. A unit according to claim 3, wherein said press member is treated with an ink-repellent agent.

16. A unit according to claim 4, wherein said press member is treated with an ink-repellent agent.

17. A unit according to claim 15, wherein the ink-repellent agent is ethylene tetrafluoride.

18. A unit according to claim 16, wherein the ink-repellent agent is ethylene tetrafluoride.

19. A liquid ejection recording apparatus including a liquid ejection recording unit according to claim 1.

* * * * *